US008217782B2

(12) United States Patent
Nelson et al.

(10) Patent No.: US 8,217,782 B2
(45) Date of Patent: Jul. 10, 2012

(54) INDUSTRIAL FIELD DEVICE WITH REDUCED POWER CONSUMPTION

(75) Inventors: Richard L. Nelson, Chanhassen, MN (US); Eric R. Lovegren, Big Lake, MN (US); James A. Johnson, Savage, MN (US)

(73) Assignee: Rosemount Inc., Eden Prairie, MN (US)

( * ) Notice: Subject to any disclaimer, the term of this patent is extended or adjusted under 35 U.S.C. 154(b) by 679 days.

(21) Appl. No.: 11/805,728

(22) Filed: May 24, 2007

(65) Prior Publication Data
US 2008/0291009 A1 Nov. 27, 2008

(51) Int. Cl.
*G08B 1/08* (2006.01)
(52) U.S. Cl. ........... 340/539.1; 340/853.2; 340/858.8; 340/693.3; 340/3.1; 340/3.9; 340/10.33; 340/10.34; 340/531; 340/538; 340/635
(58) Field of Classification Search .............. 340/3.1
See application file for complete search history.

(56) References Cited

U.S. PATENT DOCUMENTS

| | | | | |
|---|---|---|---|---|
| 4,540,890 | A | | 9/1985 | Gangemi et al. ............ 307/40 |
| 5,422,626 | A | * | 6/1995 | Fish ........................ 340/539.17 |
| 5,727,110 | A | * | 3/1998 | Smith et al. ................. 385/147 |
| 6,198,913 | B1 | * | 3/2001 | Sung et al. ................. 455/343.3 |
| 7,046,153 | B2 | * | 5/2006 | Oja et al. ..................... 340/573.4 |
| 2002/0097031 | A1 | | 7/2002 | Cook et al. .................. 323/273 |
| 2003/0171827 | A1 | * | 9/2003 | Keyes, IV et al. ............. 700/19 |
| 2003/0236937 | A1 | * | 12/2003 | Barros De Almeida et al. .......................... 710/305 |
| 2005/0130605 | A1 | * | 6/2005 | Karschnia et al. ........... 455/90.3 |
| 2005/0195093 | A1 | * | 9/2005 | Karschnia et al. ........... 340/693.1 |
| 2005/0208908 | A1 | * | 9/2005 | Karschnia et al. ........... 455/127.1 |
| 2005/0245291 | A1 | * | 11/2005 | Brown et al. ................ 455/572 |
| 2005/0289276 | A1 | * | 12/2005 | Karschnia et al. ........... 710/305 |
| 2006/0092039 | A1 | | 5/2006 | Saito et al. ................ 340/825.37 |
| 2006/0148410 | A1 | * | 7/2006 | Nelson et al. .............. 455/67.11 |
| 2007/0239400 | A1 | * | 10/2007 | Skorpik et al. ............... 702/188 |
| 2007/0273205 | A1 | * | 11/2007 | Aoyama ........................ 307/3 |

OTHER PUBLICATIONS

Chinese Office Action from corresponding application Serial No. CN 200880016735.6, dated Aug. 23, 2011, 11 pgs.
"Communication pursuant to Article 94(3) EPC" for related Application No. 08767762.1; date Apr. 13, 2010; 4 pages.
"Communication pursuant to Article 94(3) EPC" for related Application No. 08767762.1-2206; date May 4, 2011; 6 pages.
"Notification of Transmittal of the International Search Report and the Written Opinion of the International Searching Authority, or the Declaration" for International application No. PCT/US2008/006314 filed May 16, 2008; 13 pages.
Japanese Office Action (with English Translation) for corresponding Japanese Application No. 2010-509348, dated Dec. 20, 2011, 5 pages.
Summons to attend Oral Proceedings and Office Action for related European Application No. 08 767 762.1-2206, dated Mar. 26, 2012, 6 pages.

* cited by examiner

*Primary Examiner* — Benjamin C Lee
*Assistant Examiner* — Curtis King
(74) *Attorney, Agent, or Firm* — Westman, Champlin & Kelly, P.A.

(57) ABSTRACT

A field device for use in monitoring or controlling an industrial process includes two wire process control loop electrical connections. Digital communications monitoring circuitry coupled to the electrical connections and is configured to control power to the field device electrical circuitry in response to a digital signal on the two wire process control loop.

21 Claims, 4 Drawing Sheets

INDUSTRIAL FIELD DEVICE WITH REDUCED POWER CONSUMPTION

BACKGROUND OF THE INVENTION

The present invention relates to the field devices of the type used in monitoring or controlling industrial processes. More specifically, the present invention relates to powering such field devices.

Field devices are used in industrial processes to monitor process variables of the process, or control such process variables. Examples of process variables include pressure, temperature, flow rate, level, etc. Typically, the field devices are located in the "field", away from a central location. For example, such field devices may be scattered throughout an oil refinery or the like. Field devices are used to transmit the measured process variables back to the control room while controllers are used to control the process from the control room.

Typically, communication between the control room and the field device occurs over a two wire process control loop. Example control loops include 4-20 mA process control loops in which a current level through the loop is used to represent a process variable, control loops operating in accordance with the HART® communications protocol, FieldBus protocol, the ProfiBus protocol, etc. In many configurations, the field device is also powered with electrical power received over the two wire process control loop.

Although field devices typically communicate using process control loops, there are situations in which wireless communications is desirable. For example, wireless communication techniques reduce, or eliminate, the wiring which is needed to connect to field devices. In such wireless configuration, there may be no process control loop available to power the field device. Therefore, an alternate power source must be used. For example, in some configurations, the field device is powered using stored power, for example, from a battery, obtained through solar cells, or other techniques. In such configurations, it is desirable to reduce the power consumption required by the field device. In other instances, the device is connected to a wired process control loop but further includes a wireless transceiver for sending or receiving communications. In such configurations, it is useful to conserve power in the device.

SUMMARY

A field device for use in monitoring or controlling an industrial process includes two wire process control loop electrical connections and field device electrical circuitry a power-on input. Digital communications monitoring circuitry couples to the electrical connections and provides a signal to the power-on input of the field device electrical circuitry in response to a digital signal on the two wire process control loop. A method of controlling operation of electrical circuitry in a field device of the type used in monitoring or controlling an industrial process is also provided. The method includes monitoring signals carried on a two wire process control loop and detecting a communications signal. Power to field device electrical circuitry is provided in response to detected digital communications signal on the two wire process control loop.

DETAILED DESCRIPTION

Figure 1:
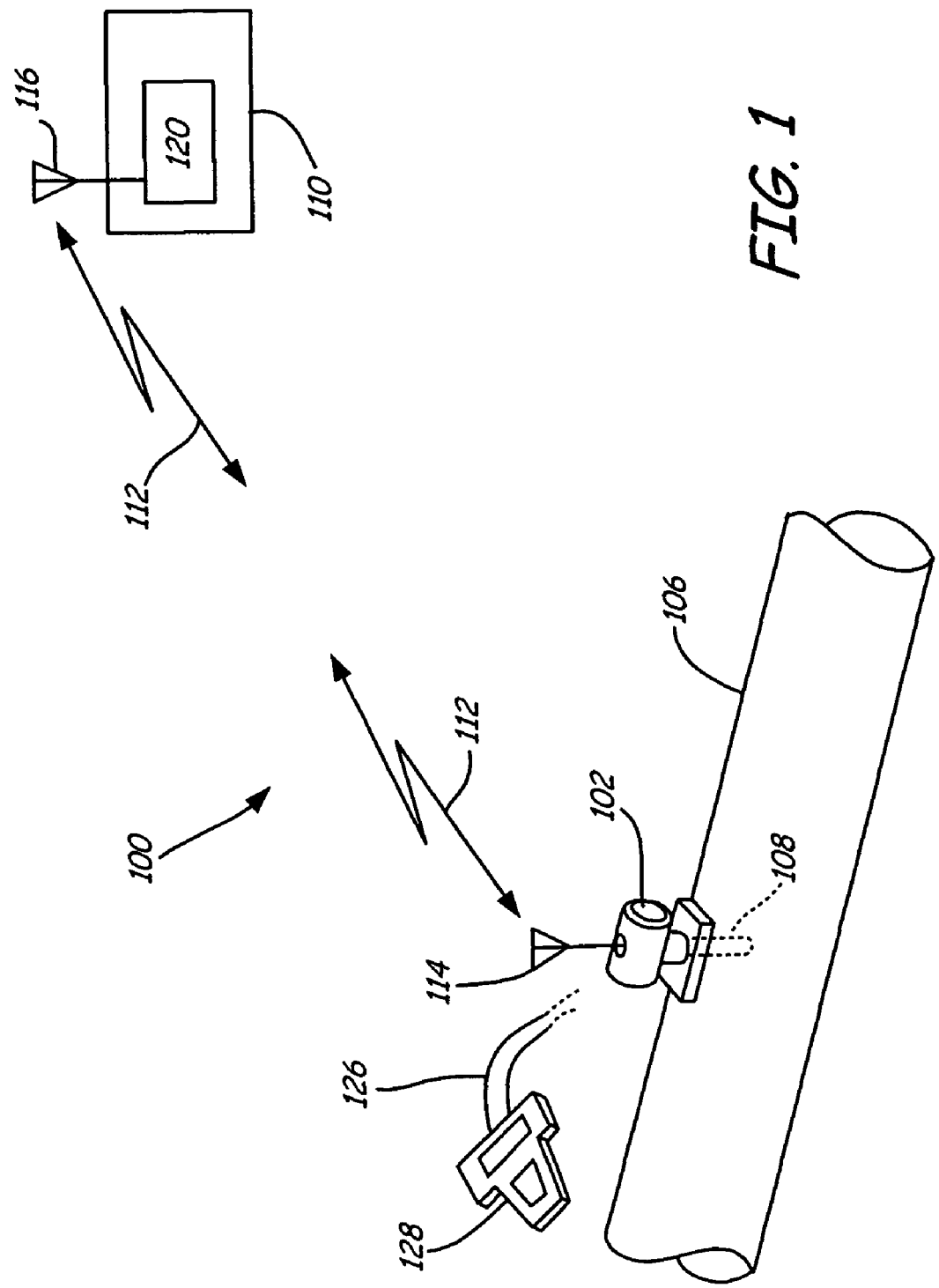
FIG. 1 is a simplified block diagram showing a process control or monitoring system.

FIG. 1 is a simplified diagram of an industrial process control system 100 including a field device 102 which is illustrated as being coupled to process piping 106. Field device 102 is illustrated as including a process interface element 108. Process interface element can comprise, for example, a sensor used to sense a process variable if field device 102 is configured as a transmitter. Similarly, process interface 108 can comprise a control element if field device 102 is configured to operate as a process controller. To further illustrate a specific example, if configured as a transmitter, field device 102 can measure the flow rate of process fluid flowing through pipe 106. On the other hand, if configured as a process controller, field device 102 can be used to control the flow rate of fluid through process piping 106.

Field device 102 communicates with another location, such as process control room 110 over a wireless communication link 112. Wireless communication link 112 extends between antenna 114 of field device 102 and antenna 116 of control room 110. Antenna 116 couples to process control equipment 120 in control room 110.

Although field device 102 is illustrated as including a wireless communication link, there are some installations in which it is also desirable for field device 102 to communicate over a two wire process control loop such as process control loop 126. In the example of FIG. 1, two wire process control loop 126 is shown as coupling to a hand held calibrator 128 which is used to communicate with, and calibrate, field device 102. Calibrator 128 is only required to couple to device 102 when, for example, device 102 requires calibration or diagnostics.

As described below in greater detail, as communications over two wire process control loop 126 is only used in some instances, the present invention reduces power consumption by field device 102 by powering down circuitry, two wire process control loop communication circuitry, when not in use. Digital communication monitoring circuitry is used to monitor process control loop 126 and is used to power up the circuitry when digital communications are detected.

Figure 2:
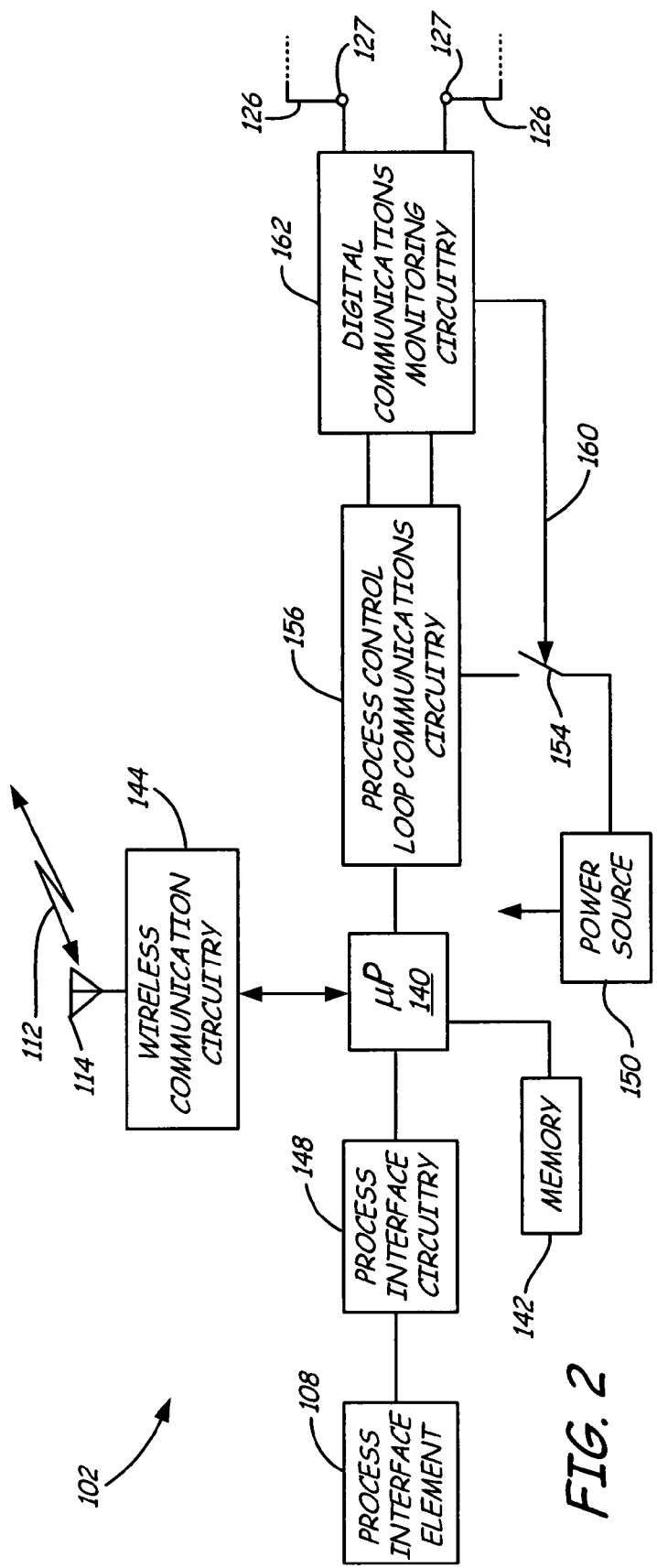
FIG. 2 is a block diagram showing electrical circuitry of a field device in accordance with the present invention.

FIG. 2 is a simplified block diagram showing circuitry of field device 102 in greater detail. Field device 102 includes the process interface element 108 (also shown in FIG. 1) which couples to a microprocessor 140 through process interface circuitry 148. Microprocessor 140 operates in accordance with programming instructions stored in memory 148. Microprocessor 140 can comprise any type of digital controller. Wireless communication circuitry 144 couples to antenna 114. Microprocessor 140 communicates over communication link 112 through wireless communication circuitry 144.

A power source 150 is provided and configured to provide electrical power to electrical circuitry of field device 102. Example, power source 150 can comprise a battery or other power storage and/or generation device. The power source can be self contained and periodically recharged or replaced, or can couple to a charging apparatus such as solar cells, or other source of power. A switch 154 is shown as coupling power source 150 through process loop communication circuitry 156. Process control loop circuitry 156 is used for communication over process control 126. Communication circuitry 156 can operate in accordance with any communication protocol including, for example, the HART® communication protocol, the FieldBus protocol, the ProfiBus protocol, or others. Communication circuitry 156 includes a power-on input. The power-on input can be a "wake up" input causing circuitry 156 to begin normal operations. In such a configuration, circuit 156 can be permanently coupled to power source 150 and simply draw more power when it receives a wake up signal. Similarly, power-on input can comprise the power input which is provided to circuitry 156. In the configuration of FIG. 2, switch 154 couples power from power source 150 to communication circuitry 156. In another example configuration, communication circuitry 156 is permanently connected to power source 150 and enters a normal operation mode when an input is received on the power-on input. In either case, the power-on input is responsive to a signal 160 from digital communications monitoring circuitry 162. Digital communications monitoring 162 also couples to process control loop 126 through electrical connectors 127. During normal operation, microprocessor 140 communicates over the wireless communication link 112 through wireless communication circuitry 144. During normal operation, process control loop communication circuitry is not powered on or is otherwise configured to require minimal power. However, if a digital communication signal is detected by digital communications monitoring circuitry 162 carried on process control loop 126, the process control loop communications circuitry 156 enters a normal communication mode requiring it to draw more power. The digital communication monitoring circuitry 162 can operate in accordance with any technique and can be configured to be responsive of any type of communication signal detected on process control loop 126. Further, in one configuration, when a digital signal is detected on process control loop 126, power from process control loop 126 can be used to recharge or provide power to power source 150.

Figure 3:
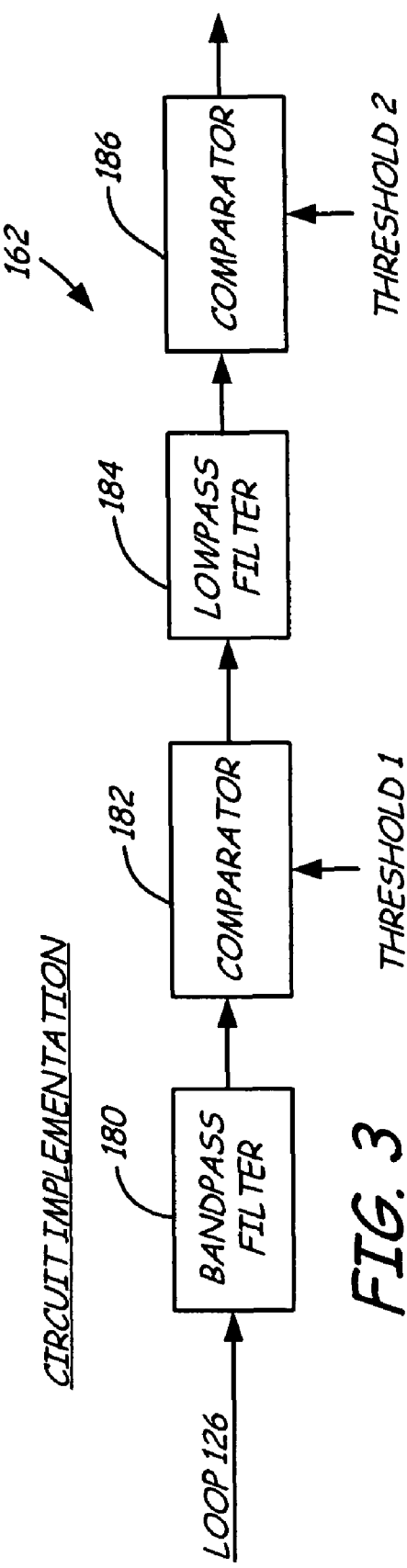
FIG. 3 is a block diagram showing digital communication monitoring circuitry of the present invention.

FIG. 3 is a simplified block diagram of digital communications monitoring circuitry 162 shown in greater detail. Monitoring circuitry 162 couples to process control loop 126. The signals from process control loop 126 are filtered by a band pass filter 180. The output from band pass filter 180 is provided to comparator 182 which compares the output from the filter 180 with a first threshold. The comparator 182 provides an output to a low pass filter 184 based upon the comparison. Low pass filter 184 provides an output to a second comparator 186 which compares the output with a second threshold. Based upon the comparison, an output is provided to the power-on input of loop communication circuitry 156 either directly or through switch 154 to cause the loop communication circuitry to enter a power-on mode.

Circuitry 162 monitors digital communications on loop 126. For example, this filter can be used to eliminate any spurious signals that can enter into the electronics. The comparator 182 compares the filtered HART® signal to a known reference voltage. This provides a square wave output to low pass filter 184. The square wave output is a function of the incoming digital communication signal. In order to avoid false interrupts, the square wave signal is filtered again using low pass filter 184. This helps to ensure that the incoming data transmission is actually a digital communication message and not simply random noise. As a final stage, the filtered square wave output is then compared to a known voltage with comparator 186. The output of comparator 186 is then provided to control the power used by process control loop communication circuitry 156. In another example configuration, the output 160 from digital communication monitoring circuitry is provided as an interrupt 185 to microprocessor 140. Microprocessor 140 is then configured to control the power used by process control loop communication circuitry 156. In such a configuration, the microprocessor 140 can cause circuitry 156 to enter a low power mode. For example, such a configuration can be used whereby communication circuitry 156 is taken offline while the microprocessor 140 assembles the communication data for transmission over processor control loop 126.

Figure 4:
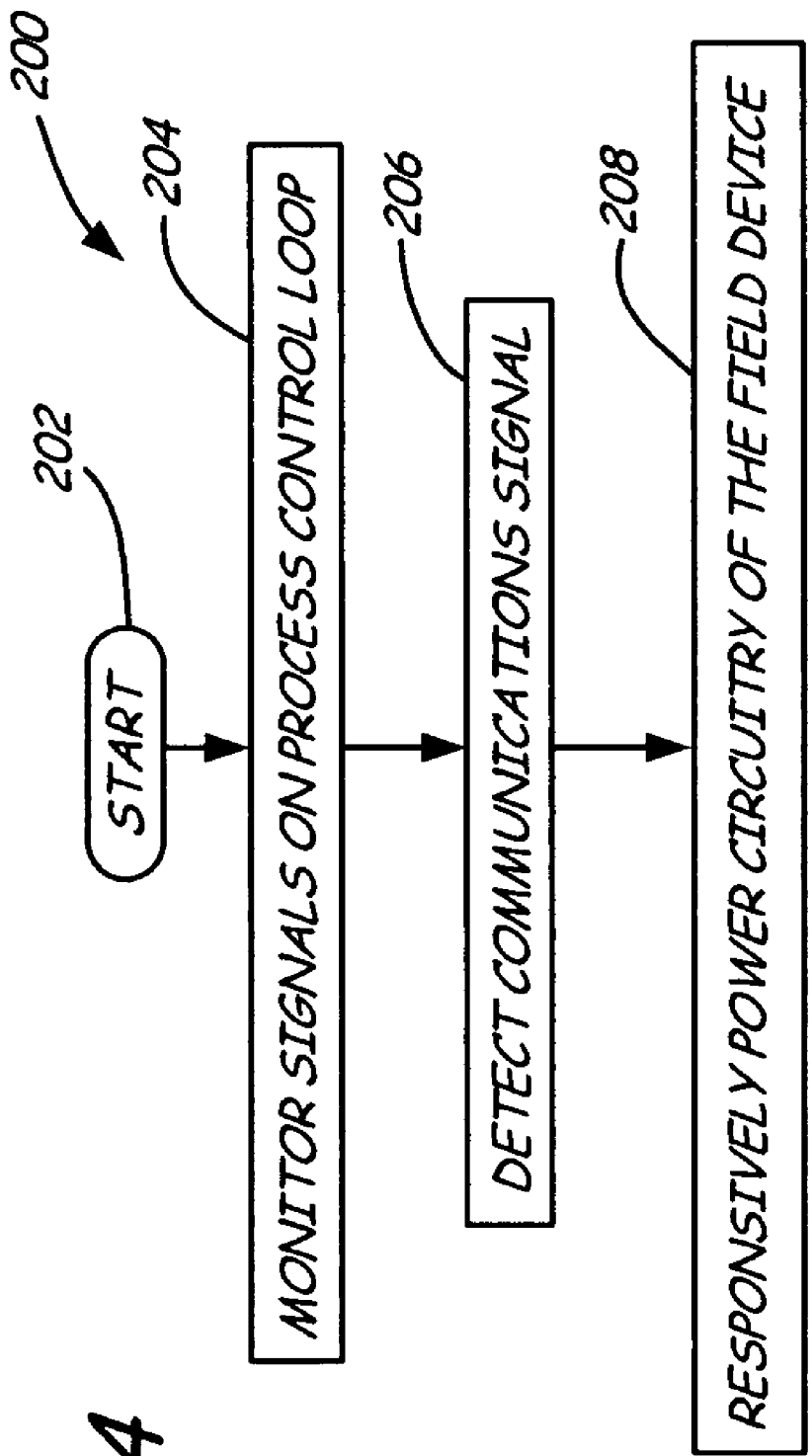
FIG. 4 is a flow chart showing steps in accordance with the present invention.

FIG. 4 is a simplified block diagram 200 showing steps in accordance with the present invention. Block diagram 200 begins at start block 202 and control is passed to block 204 where signals on the process control loop 126 are monitored. At step 206, a communications signal is detected based upon the monitored signals from the two wire process control loop. At step 208, in response to detected communications, power is provided to circuitry of the field device 102. These steps can be implemented in hardware, software, or a combination of the two.

Although the present invention has been described with reference to preferred embodiments, workers skilled in the art will recognize that changes may be made in form and detail without departing from the spirit and scope of the invention. Although the illustrations set forth herein show providing power to communication circuitry, the present invention can be used to control power or operation of any circuitry within the field device 102 including digital circuitry, analog circuitry, or a combination. Such field device electrical circuitry can comprise, for example, a microprocessor, or other digital control circuitry.

What is claimed is:

1. A field device for use in monitoring or controlling an industrial process, comprising:
  an internal power source;
  wireless communication circuitry configured to communicate wirelessly with other equipment in the industrial process and powered by the internal power source;
  two wire process control loop electrical connections configured to couple to a two wire process control loop;
  field device loop communication circuitry having a power-on input configured to communicate on the two wire process control loop when powered in response to the power-on input; and
  digital communications monitoring circuitry coupled to the electrical connections and configured to provide a signal to the power-on input of the field device loop communication circuitry in response to a digital signal on the two wire process control loop, whereby the field device loop communication circuitry is powered off when no digital signal on the two wire process control loop is detected and powered on with power from the internal power source when a digital signal on the two wire process control loop is detected wherein power on of the loop communication circuitry is independent of the power on of the wireless communication circuitry.

2. The apparatus of claim 1 including a switch configured to couple electrical power to the power-on input of the field device loop communication circuitry in response to the digital communications monitoring circuitry.

3. The apparatus of claim 1 wherein the power-on input comprises a wakeup input of the field device electrical circuitry responsive to the digital communication monitoring circuitry.

4. The apparatus of claim 1 wherein the digital signal on the two-wire process control loop comprises a digital communication signal in accordance with a communications standard protocol.

5. The apparatus of claim 4 wherein the communication standard protocol comprises the HART® communication protocol.

6. The apparatus of claim 1 wherein the two wire process control loop comprises a 4-20 mA process control loop.

7. The apparatus of claim 1 including a process variable sensor configured to sense a process variable.

8. The apparatus of claim 1 wherein the digital communications monitoring circuitry includes a filter.

9. The apparatus of claim 1 wherein the digital communications monitoring circuitry includes a comparator arranged to compare a signal with a threshold level and responsibly provide the signal to the power-on input of the field device loop communication circuitry.

10. The apparatus of claim 1 including a band pass filter and a first comparator configured to compare the output of the band pass filter with first threshold, a low pass filter and a second comparator configured to compare an output from a low pass filter with a second threshold.

11. The apparatus of claim 10 wherein the output from the first comparator comprises a square wave.

12. The apparatus of claim 1 wherein the internal power source comprises a battery configured to power the wireless communication circuitry of the field device.

13. The apparatus of claim 1 wherein the two wire process control loop is configured to couple to a portable configuration tool for use in configuring the field device.

14. A method of controlling operation of electrical circuitry in a field device of the type used in monitoring or controlling an industrial process, the method comprising:
 wirelessly communicating with another device in the industrial process using power from an internal power source;
 monitoring signals carried on a two wire process control loop;
 detecting a communications signal from the monitored signals on the two wire process control loop and providing a power on signal to loop communication circuitry; and
 powering the loop communication circuitry in response to the power on signal with power from the internal power source when a digital signal on the two wire process control loop is detected wherein power on of the loop communication circuitry is independent of the power on of the wireless communication circuitry.

15. The method of claim 14 including coupling electrical power to a power-on input of the loop communication circuitry in response to the digital communications monitoring circuitry.

16. The method of claim 15 wherein the power-on input comprises a wakeup input of a microprocessor.

17. The method of claim 14 wherein the communications signal on the two-wire process control loop comprises a digital communication signal in accordance with a communications standard protocol.

18. The method of claim 14 wherein the two wire process control loop comprises a 4-20 mA process control loop.

19. The method of claim 14 including sensing a process variable with a process variable sensor.

20. The method of claim 14 including filtering the signals on the two wire process control loop.

21. The method of claim 14 including comparing the monitored signals.

* * * * *